United States Patent
Graff et al.

(10) Patent No.: US 11,729,238 B2
(45) Date of Patent: Aug. 15, 2023

(54) METHOD, SYSTEM AND COMPUTER PROGRAM PRODUCT FOR UPSPEEDING IN A VIDEOCONFERENCING SESSION

(71) Applicant: Pexip AS, Oslo (NO)

(72) Inventors: Håvard Graff, Oslo (NO); Tulio Beloqui, Oslo (NO)

(73) Assignee: Pexip AS, Oslo (NO)

( * ) Notice: Subject to any disclaimer, the term of this patent is extended or adjusted under 35 U.S.C. 154(b) by 0 days.

(21) Appl. No.: 17/989,120

(22) Filed: Nov. 17, 2022

(65) Prior Publication Data

US 2023/0171299 A1   Jun. 1, 2023

(30) Foreign Application Priority Data

Nov. 26, 2021 (NO) .................................. 20211436

(51) Int. Cl.
G06F 15/16 (2006.01)
H04L 65/75 (2022.01)
H04L 47/2416 (2022.01)

(52) U.S. Cl.
CPC .......... *H04L 65/75* (2022.05); *H04L 47/2416* (2013.01)

(58) Field of Classification Search
CPC ............................ H04L 65/75; H04L 47/2416
See application file for complete search history.

(56) References Cited

U.S. PATENT DOCUMENTS

| | | | |
|---|---|---|---|
| 2007/0214490 A1* | 9/2007 | Cheng | H04N 21/4305 725/135 |
| 2007/0236599 A1* | 10/2007 | van Beek | H04N 7/163 348/419.1 |
| 2009/0013086 A1* | 1/2009 | Greenbaum | H04N 21/4341 709/231 |
| 2011/0013514 A1 | 1/2011 | Mahkonen | |
| 2013/0128735 A1 | 5/2013 | Li et al. | |
| 2013/0159495 A1* | 6/2013 | Wang | H04N 19/146 709/224 |
| 2014/0023088 A1 | 1/2014 | Polk et al. | |

FOREIGN PATENT DOCUMENTS

| | | |
|---|---|---|
| EP | 2019522 A2 | 1/2009 |
| WO | 2010148048 A1 | 12/2010 |
| WO | 2017052436 A1 | 3/2017 |
| WO | 2017084691 A1 | 5/2017 |
| WO | 2021089487 A1 | 5/2021 |

OTHER PUBLICATIONS

Norwegian Industrial Property Office, Norwegian Search Report for corresponding Norwegian Application No. 20211436, dated Jun. 22, 2022, 2 pages.

European Patent Office, International-Type Search Report, for corresponding Norwegian Application No. 20211436, dated Jun. 8, 2022, 9 pages.

\* cited by examiner

*Primary Examiner* — Oleg Survillo
(74) *Attorney, Agent, or Firm* — Christopher & Weisberg, P.A.

(57) ABSTRACT

A system, method and computer program of upspeeding a media stream transmitted over a communication link from a sender device to a receiving device.

19 Claims, 3 Drawing Sheets

METHOD, SYSTEM AND COMPUTER PROGRAM PRODUCT FOR UPSPEEDING IN A VIDEOCONFERENCING SESSION

CROSS-REFERENCE TO RELATED APPLICATION

This application is related to and claims priority to Norwegian Patent Application No. 20211436, filed Nov. 26, 2021, the entirety of which is incorporated herein by reference.

FIELD

The present invention relates video conferencing, in particular to providing a method, system and computer program product for upspeeding a media stream transmitted over a communication link from a sender device to a receiving device.

BACKGROUND

Transmission of audio and moving pictures in real-time is employed in several applications like e.g. video conferencing, team collaboration software, net meetings and video telephony. Terminals and endpoints being able to participate in a conference may be traditional stationary video conferencing endpoints, external devices, such as mobile and computer devices, smartphones, tablets, personal devices and PCs, and browser-based video conferencing terminals.

Video conferencing systems allow for simultaneous exchange of audio, video and data information among multiple conferencing sites. For performing multipoint video conferencing, there usually is a Multipoint Conferencing Node (MCN) that provides switching and layout functions to allow the endpoints and terminals of multiple sites to intercommunicate in a conference. Such nodes may also be referred to as Multipoint Control Units (MCUs), Multi Control Infrastructure (MCI), Conference Nodes and Collaborations Nodes (CNs). MCU is the most commonly used term, and has traditionally has been associated with hardware dedicated to the purpose, however, the functions of an MCN could just as well be implemented in software installed on general purpose servers and computers, so in the following, all kinds of nodes, devices and software implementing features, services and functions providing switching and layout functions to allow the endpoints and terminals of multiple sites to intercommunicate in a conference, including (but not excluding) MCUs, MCIs and CNs are from now on referred to as MCNs.

The MCN links sites, endpoints and participants together by receiving conference signals from the sites/endpoints, processing the received signals, and transmitting the processed signals to appropriate sites/endpoints. The conference signals include audio, video, data and control information. The MCN processes the received conference signals from one or more sites/endpoints based on the requirements/capabilities of each site/endpoint receiving signals from the MCN.

FIG. 1 schematically illustrates multi-point videoconferencing system 100 with three videoconferencing terminals 101, 102, 103 in communication with a multipoint conferencing node (MCN) 104. In the multi-point videoconferencing system 100 media passes through the MCN 104. Input audio and video 101a, 102a, 103a captured at the videoconferencing terminals 101, 102, 103 is transmitted to the MCN 104, mixed with the audio and video from the other videoconferencing terminals, and the mixed audio and video 101b, 102b, 103b is transmitted back to the videoconferencing terminals 101, 102, 103.

A transcoding MCN comprises a plurality of encoders that may translate signals from one video or audio codec to another codec, change picture size, change video quality, change audio quality, change bitrate, combine conference signals from multiple participants into various layouts etc.

A switching MCN receives video and audio from each site/endpoint in a plurality of audio qualities, video qualities, picture sizes, and corresponding bitrates, and the switching MCU forwards audio and media streams to other sites/endpoints based on their capabilities and/or requirements. A switching MCN may for example receive four different media stream resolutions; 1080p: 5000 kbps video, 256 Kbps audio, 720p: 2500 kbps video, 256 kbps audio, 560p: 1500 kbps video, 256 kbps audio, and/or 360p: 500 kbps video, 128 kbps audio.

Network resources are in general limited. A video conferencing session may occupy a considerable part of available network resources, in particular in home-networks, when the media transmitted from the MCN are of high quality and/or sent with high bitrates. Congestion occurs when more data is sent than a receiving network is capable of receiving. In this state packet delay and packet loss occur, and the quality of service is poor. A participant in a video conferencing session on a congested network may then experience frozen images, broken audio etc. The participant may perceive this as a problem at the video conferencing service provider, e.g. the MCN, even when it the participant's home network that is to blame. It is therefore necessary to provide congestion control at the sender side to avoid sending more data than a network path to a receiver can handle. The sender side may then need to reduce the sent bitrate, i.e. perform downspeeding of the video conferencing link between the MCN and the participant/endpoint. Downspeeding can be defined as adjusting the bit rate down for adapting to reduced available bandwidths, when encoding media at multiple bit rates is possible.

FIG. 2 is a schematic illustration of a prior art message flow 200 between a sender device 201 and a receiving device 202, the sender device transmitting a media stream 203 over a communication link to the receiving device 202. Transport-wide Congestion Control (TWCC) is an extension of the Real-time Transport Protocol (RTP) and Real-Time Transport Control Protocol (RTCP) for use in congestion control algorithms for RTP-based media flow. The packets of the media stream 203 comprises a RTP header extension containing a transport-wide packet sequence number, i.e. a packet identifier. TWCC proposes that the receiving device transmits an RTCP feedback message 204 feeding back the arrival times and sequence numbers of the packets of the media stream 203 received over the connection. The sender device keeps a map of in-flight packets, and upon receiving the feedback message 204 looks up the transmission timestamp of the corresponding packet. From these two timestamps the sender can compute metrics such as inter-packet delay variation and estimated queueing delay.

Once congestion has been detected, and downspeeding has been performed, the quality of the video conferencing session is reduced, thus the participant would prefer that the sender side increases the sent bitrate, i.e. perform upspeeding, of the video communication link between the sender side and the participant/endpoint, as soon as the communication link is no longer congested. Upspeeding can be defined as adjusting the bit rate up for adapting to increased available bandwidths, when encoding media at multiple bit rates is possible. Upspeeding the communication link to quickly may however put the communication link back into a state of congestion.

In in order to provide the best available video quality at any time it is therefore a need in the art for a system and method for sender side upspeeding of a media stream transmitted over a communication link from the sender device to a receiving device.

SUMMARY

In view of the above, an object of the present invention is to overcome or at least mitigate drawbacks of prior art video conferencing systems In a first aspect the invention provides method of upspeeding a media stream transmitted over a communication link from a sender device to a receiving device, the communication link configured with a maximum bitrate, the method comprising the steps of:

transmitting a first transmission bitrate of media packets in the media stream;

transmitting a second transmission bitrate of recovery packets into the media stream; each recovery packet adapted to replace a missing media packet in the media stream;

mapping for each packet in the media stream a packet identifier, a transmission timestamp and a packet size;

transmitting for each packet received at the receiving device a feedback message to the sender device, the feedback message comprising the packet identifier and an arrival timestamp;

determining a real transmission rate for each sliding window of N transmitted packets by dividing a packet size sum of the N transmitted packets with a time difference between a transmission time stamp of the last of the N transmitted packets and a transmission time stamp of the first of the N transmitted packets;

determining a real received rate for each sliding window of the N transmitted packets by dividing the packet size sum of the N transmitted packets with a time difference between the arrival time stamp of the last of the N transmitted packets and the arrival time stamp of the first of the N transmitted packets;

determining a delta rate by dividing the difference between the real transmission rate and the real received rate with the real transmission rate;

mapping for each recovery packet in the media stream the packet identifier of the recovery packet and the packet identifier of the packet the recovery packet is adapted to replace;

determining a packet as missing when none of the feedback messages comprises the packet identifier of the packet;

determining a packet as recovered when a feedback message comprises the packet identifier of a recovery packet corresponding to the missing packet; and determining a packet recovery success rate by dividing a total number of packets determined as recovered within a second sliding window with a total number of packets determined as missing within the second sliding window; wherein the step of upspeeding the media stream comprises the steps of:

if the sum of the first transmission bitrate and the second transmission bitrate is below the maximum bitrate, and the delta rate is below a first upspeeding threshold, then transmitting a third transmission bitrate of recovery packets in the media stream in addition to the second transmission bitrate of recovery packets, if the delta rate exceeds the first upspeeding threshold and the packet recovery success rate is below a second upspeeding threshold, then stopping transmitting the third transmission bitrate of recovery packets, or if the delta rate is below the first upspeeding threshold and the packet recovery success rate is above the second upspeeding threshold, then increasing the first transmission bitrate of media packets in the media stream with the third transmission bitrate, stopping transmitting the third transmission rate of recovery packets, and returning to the first step of upspeeding the media stream.

The present invention provides an accurate and instant decision of upspeeding at an optimal timing and to an optimal extent. When network conditions are getting better, a decision of upspeeding and to which amount, is made. The time of upspeeding is tuned not to occur too early to prevent creating congestion due to just temporary network improvements, but at the same time not too late to prevent fatal quality problems like image freeze or audio outages. The upspeeding amount is also tuned optimally according to the current bandwidth conditions to avoid a larger increase in bitrate than the network conditions allow. The aspects of the present invention will therefore result in a video conferencing, which is much more robust to changes in network and bandwidth condition, and by that a better user experience.

One advantage of the present invention is that the upspeeding uses the third transmission bitrate of recovery packets to probe the communication link. Since the third transmission rate of recovery packets are redundant packets that may replace missing real packets, those packets may replace packets that are lost if the upspeeding process goes wrong. The upspeeding may then be stopped without the user noticing that something is wrong. This allows for a much faster upspeeding process than prior art upspeeding processes.

In one embodiment, if the first transmission rate of media packets has increased with the third transmission bitrate at least one time, then the step of transmitting a third bitrate of recovery packets in the media stream may further comprising multiplying the third bitrate with a multiplication factor.

Since the upspeeding process is resistant to packet loss due to the additional recovery packets, it is possible to after a first successful attempt of upspeeding adding even more recovery packets on the next attempt.

The multiplication factor does not have to be the same each time, it is also possible to increase the multiplication factor for each attempt, thus in one embodiment, if the first transmission rate of media packets has increased with the third transmission bitrate at least one time, then the method may further include increasing the multiplication factor each time the first transmission rate of media packets has increased with the third transmission bitrate.

In one embodiment, the first upspeeding threshold may be 0.1.

In one embodiment, the second upspeeding threshold may be in the range 0.6-1.0, preferably 0.8.

In one embodiment, the step of transmitting the third transmission bitrate of recovery packets in the media stream may further comprises setting the third transmission bitrate such that the sum of the first transmission bitrate, the second transmission bitrate and the third transmission bitrate is below the maximum bitrate.

In one embodiment, the step of transmitting the third transmission bitrate of recovery packets in the media stream may further comprises setting the third transmission bitrate by rounding the third transmission bitrate down to nearest 64 kbps.

In one embodiment, the step of increasing the first transmission bitrate of media packets in the media stream with the third transmission bitrate may comprise instructing an encoder to encode media packet at the increased first transmission bitrate of media packets.

In one embodiment, the step of increasing the first transmission bitrate of media packets in the media stream with the third transmission bitrate may comprise selecting a closest matching media stream from an encoder providing a plurality of media streams at different transmission rates.

In a second aspect the invention provides a system for upspeeding of a media stream transmitted over a communication link from a sender device to a receiving device, the communication link configured with a maximum bitrate, the system being adapted to:

transmitting, with the sender device, a first transmission bitrate of media packets in the media stream;

transmitting, with the sender device, a second transmission bitrate of recovery packets into the media stream, each recovery packet adapted to replace a missing media packet in the media stream;

mapping, with the sender device, for each packet in the media stream a packet identifier, a transmission timestamp and a packet size;

transmitting, with the receiving device, for each packet received at the receiving device a feedback message to the sender device, the feedback message comprising the packet identifier and an arrival timestamp;

determining, with the sender device, a real transmission rate for each sliding window of N transmitted packets by dividing a packet size sum of the N transmitted packets with a time difference between a transmission time stamp of the last of the N transmitted packets and a transmission time stamp of the first of the N transmitted packets;

determining, with the sender device, a real received rate for each sliding window of the N transmitted packets by dividing the packet size sum of the N transmitted packets with a time difference between the arrival time stamp of the last of the N transmitted packets and the arrival time stamp of the first of the N transmitted packets;

determining, with the sender device, a delta rate by dividing the difference between the real transmission rate and the real received rate with the real transmission rate;

mapping, with the sender device, for each recovery packet in the media stream the packet identifier of the recovery packet and the packet identifier of the packet the recovery packet is adapted to replace;

determining, with the sender device, a packet as missing when none of the feedback messages comprises the packet identifier of the packet;

determining, with the sender device, a packet as recovered when a feedback message comprises the packet identifier of a recovery packet corresponding to the missing packet; and determining, with the sender device, a packet recovery success rate by dividing a total number of packets determined as recovered within a second sliding window with a total number of packets determined as missing within the second sliding window;

wherein the sender device is further adapted to:

if the sum of the first transmission bitrate and the second transmission bitrate is below the maximum bitrate, and the delta rate is below a first upspeeding threshold, then transmitting a third transmission bitrate of recovery packets in the media stream in addition to the second transmission bitrate of recovery packets;

if the delta rate exceeds the first upspeeding threshold and the packet recovery success rate is below a second upspeeding threshold, then stopping transmitting the third transmission bitrate of recovery packets; or if the delta rate is below the first upspeeding threshold and the packet recovery success rate is above the second upspeeding threshold, then increasing the first transmission bitrate of media packets in the media stream with the third transmission bitrate, stopping transmitting the third transmission rate of recovery packets.

In one embodiment, the sender device if the first transmission rate of media packets has increased with the third transmission may be further adapted to multiplying the third bitrate with a multiplication factor.

In one embodiment, the sender device may be further adapted to increasing the multiplication factor each time the first transmission rate of media packets has increased with the third transmission bitrate.

In one embodiment, the first upspeeding threshold may be 0.1.

In one embodiment, the second upspeeding threshold may be in the range 0.6-1.0, preferably 0.8.

In one embodiment, the sender device may be further adapted to setting the third transmission bitrate such that the sum of the first transmission bitrate, the second transmission bitrate and the third transmission bitrate is below the maximum bitrate.

In one embodiment, the sender device may be further adapted to setting the third transmission bitrate by rounding the third transmission bitrate down to nearest 64 kbps.

In one embodiment, the sender device may be further adapted to instructing an encoder to encode media packet at the increased first transmission bitrate of media packets.

In one embodiment, the sender device may be further adapted to selecting a closest matching media stream from an encoder providing a plurality of media streams at different transmission rates.

In a third aspect the invention provides a computer program product comprising instructions that when executed on a processor performs the method of the first aspect of the invention.

The second and third aspect of the invention provides the same improvements and advantages as the first aspect of the invention.

DETAILED DESCRIPTION

According to embodiments of the present invention as disclosed herein, the above-mentioned disadvantages of solutions according to prior art are eliminated or at least mitigated.

Figure 1:
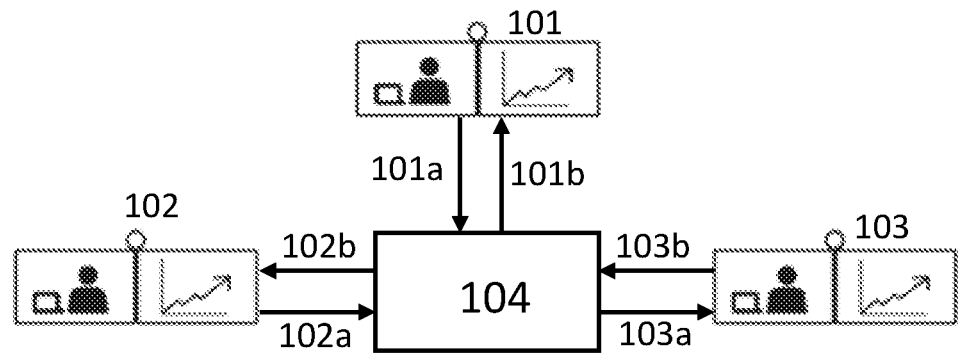
FIG. 1 is a schematic illustration of a multi-point videoconferencing system.
Figure 2:
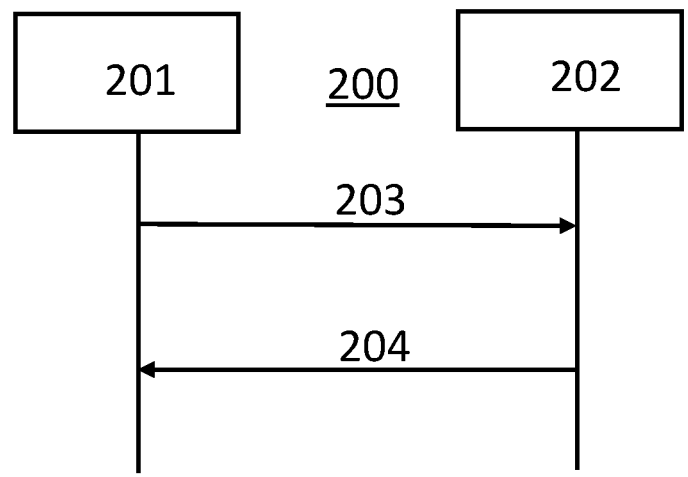
FIG. 2 is a schematic illustration of a message flow between a sender device and a receiving device.
Figure 3:
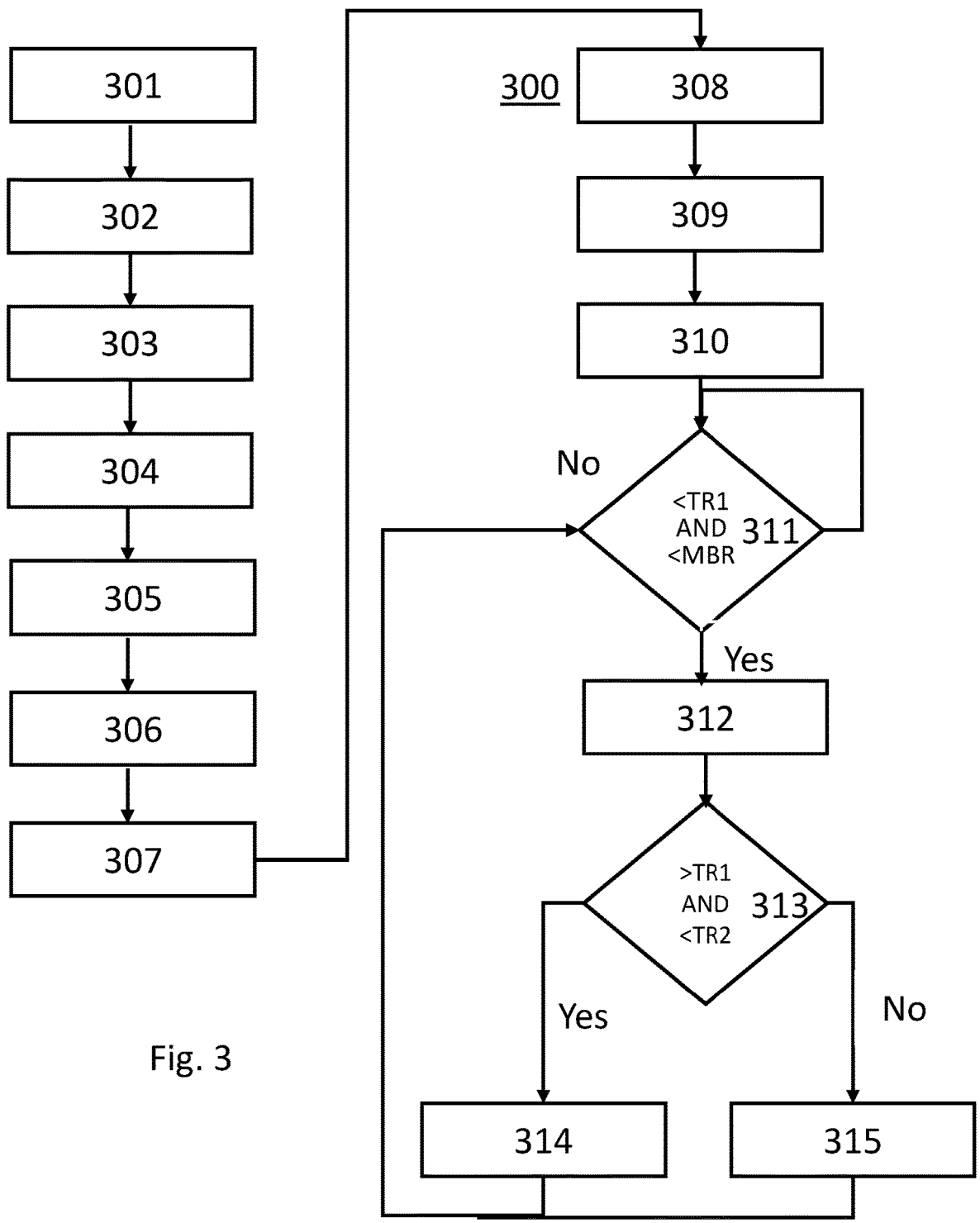
FIG. 3 is an exemplary flowchart illustrating an exemplary embodiment of the present invention.

FIG. 3 is a schematic illustration of an exemplary method 300 of upspeeding a media stream transmitted over a communication link from the sender device 201 to the receiving device 202 in a multi-point videoconferencing system 100. The sender device 201 is preferably a MCN 104, however, the method 300 may also be performed by a videoconferencing endpoint 101a, 101b, 101c. The first step 301 comprises transmitting a first transmission bitrate of media packets in the media stream 203. The next step 302 comprises transmitting a second transmission bitrate of recovery packets into the media stream 203, each recovery packet adapted to replace a missing media packet in the media stream. The media stream 203 is a downspeeded media stream.

The next step 303 comprises mapping for each packet in the media stream 203 a packet identifier, a transmission timestamp and a packet size. The packet identifier and the transmission timestamp may in one embodiment be implanted according to the definitions of TWCC. The packet size is a measurement of the size of the packet in the media stream in e.g. bits or bytes. The next step 304 comprises transmitting for each packet received at the receiving device 202 a feedback message 204 to the sender device 201, the feedback message 204 comprising the packet identifier and an arrival timestamp. Thus, the receiving device 202 determines the arrival time of each packet in the media stream 203 and returns the arrival time in the arrival timestamp of the feedback message 204.

Then, in the next step 305, the sender device 201 determines a real transmission rate for each sliding window of N transmitted packets by dividing a packet size sum of the N transmitted packets with a time difference between a transmission time stamp of the last of the N transmitted packets and a transmission time stamp of the first of the N transmitted packets. The real transmission rate is typically determined in bits/second. When determining the real transmission rate for the first sliding window of N transmitted packets, the real transmission rate is determined for consecutive windows of length N each time a new packet is transmitted from the sender device 201. The first sliding window of N transmitted packets may in one embodiment be the number of packets, e.g. 25 packets, or a time frame, e.g. 100 ms. Similarly, in the next step 306, the sender device 201 determines a real received rate for the first sliding window of the N transmitted packets by dividing the packet size sum of the N transmitted packets with a time difference between the arrival time stamp of the last of the N transmitted packets and the arrival time stamp of the first of the N transmitted packets. In step 307, the sender device 201 determines a delta rate by dividing the difference between the real transmission rate and the real received rate with the real transmission rate:

$$\text{delta\_rate} = (\text{real transmission rate} - \text{real received rate}) / (\text{real transmission rate}).$$

A high delta_rate may indicate that there is congestion over the communication link between the sender device 201 and the receiving device 202. However, a high delta_rate value may also be due to a high constant packet loss over the communication link.

The second transmission bitrate of recovery packets into the media stream 203 is utilized in packet loss resilience methods such as Forward Error Correction (FEC) and RTP retransmission (RTX). The recovery packets in the media stream 203 are each adapted to replace a missing packet of the media stream 203, such that the participants in the video conferencing session does not experience frozen images etc. A measure of the delta_rate combined with a measure of success of the packet loss resilience methods has been found to be very useful when upspeeding the media stream 203.

A delta_rate value above the first downspeeding threshold indicates that there is congestion over the communication link between the sender device 201 and the receiving device 202. However, a delta_rate value may also be due to a high constant packet loss over the communication link. Packet loss resilience methods such as Forward Error Correction (FEC) and RTP retransmission (RTX) transmits recovery packets into the media stream 203, each recovery packet adapted to replace a missing packet of the media stream 203, such that the participants in the video conferencing session does not experience frozen images etc. Downspeeding the media stream 203 in such a situation would reduce, rather than increase, the quality of service for a participant on the lossy network.

In step 308, the sender device 201, is mapping for each recovery packet in the media stream the packet identifier of the recovery packet and the packet identifier of the packet the recovery packet is adapted to replace. Step 308 is typically performed simultaneous with step 303.

In step 309, the sender device 201 determines a packet as missing when none of the feedback messages 204 comprises the packet identifier of the packet. Then in step 310, the sender device determines a packet as recovered when a feedback message 204 comprises the packet identifier of a recovery packet corresponding to the missing packet.

Then in step 310, the sender device 201 determines a packet recovery success rate by dividing a total number of packets determined as recovered within a second sliding window with a total number of packets determined as missing within the second sliding window:

$$\text{packet\_recovery\_success\_rate} = (\text{number of recovered packets}) / (\text{number of missing packets}).$$

In step 311, the sender device 201 determines if it possible to upspeed the media stream 203. If the sum of the first transmission bitrate and the second transmission bitrate is below the maximum bitrate MBR, and the delta rate is below a first upspeeding threshold TR1, then the method proceeds to step 312. In a preferred embodiment, the first upspeeding threshold TR1 is 0.1.

In step 312, the sender device 201 starts transmitting a third transmission bitrate of recovery packets in the media stream in addition to the second transmission bitrate of recovery packets. The third transmission rate of recovery packets are redundant packets that may replace missing real packets, such that the redundant recovery packets may replace real packets that are lost if the upspeeding cause trouble. The third transmission bitrate of recovery packets in the media stream is normally set such that the sum of the first transmission bitrate, the second transmission bitrate and the third transmission bitrate is below the maximum bitrate MBR.

One advantage of the present invention is that the upspeeding uses the third transmission bitrate of recovery packets to probe the communication link. Since the third transmission rate of recovery packets are redundant packets that may replace missing real packets, those packets may replace packets that are lost if the upspeeding process goes wrong. The upspeeding may then be stopped without the user noticing that something is wrong. This allows for a much faster upspeeding process than prior art upspeeding processes. Hence, if in step 312 it is determined that the first transmission rate of media packets has increased with the third transmission bitrate at least one time, then the step of transmitting a third bitrate of recovery packets in the media stream may further comprising multiplying the third bitrate with a multiplication factor. That is, if one successful upspeeding has been performed, then the next attempt may be a more aggressive attempt, such as increasing the third transmission bitrate with 10%, i.e. a multiplication factor of 1.1.

The multiplication factor does not have to be the same each time, it is also possible to increase the multiplication factor for each attempt, thus in one embodiment, if the first transmission rate of media packets has increased with the third transmission bitrate at least one time, then the method may further include increasing the multiplication factor each time the first transmission rate of media packets has increased with the third transmission bitrate. The multiplication factor may be increased linearly or exponentially. One preferred increase of the multiplication factor is 1.1, 1.2, 1.3, 1.5, 1.6, 1.7, 2.0, 3.0.

In one embodiment of the step of transmitting the third transmission bitrate of recovery packets in the media stream further comprises setting the third transmission bitrate by rounding the third transmission bitrate down to nearest 64 kbps. This reduces the number of upspeeding attempts and provides for a stable upspeeding process.

After the sender device 201 starts transmitting the third transmission bitrate, the sender device 201 proceeds to step 313 of determining if the upspeeding is causing trouble. If the delta rate exceeds the first upspeeding threshold TR1 and the packet recovery success rate is below a second upspeeding threshold TR2, then the method proceeds to step 314. In step 314 the sender device 201 is stopping transmitting the third transmission bitrate of recovery packets and returns to step 311. This returns the communication link to good conditions. The second upspeeding threshold TR2 is in the range 0.6-1.0, preferably 0.8.

If it is determined in step 313 that the delta rate is below the first upspeeding threshold TR1 and the packet recovery success rate is above the second upspeeding threshold TR2, then the method proceeds to step 315. In step 315 the sender device 201 is increasing the first transmission bitrate of media packets in the media stream with the third transmission bitrate, and is stopping transmitting the third transmission rate of recovery packets, and is returning to the first step of upspeeding the media stream 311.

If the sender device 201 comprises and encoder, e.g. is a transcoding MCN 104 or a videoconferencing endpoint 101a, 101b, 101c, then the step of increasing the first transmission bitrate of media packets in the media stream 203 with the third transmission bitrate comprises instructing an encoder to encode media packet at the increased first transmission bitrate of media packets.

In the sender device 201 does not comprises an encoder, e.g. a switching MCN 104, the step of increasing the first transmission bitrate of media packets in the media stream with the third transmission bitrate comprises selecting a closest matching media stream from an encoder providing a plurality of media streams at different transmission rates.

The step 310 of determining the packet recovery success rate, may in one embodiment further comprising the step of measuring a round trip delay from the receiving device 202 requests a recovery packet to the feedback message 204 comprises the packet identifier of the recovery packet, and waiting the at least one round trip delay before determining the packet recovery success rate. The measurement of the round-trip delay gives packet loss resilience methods time to recover the missing packet before performing the determination.

Figure 4:
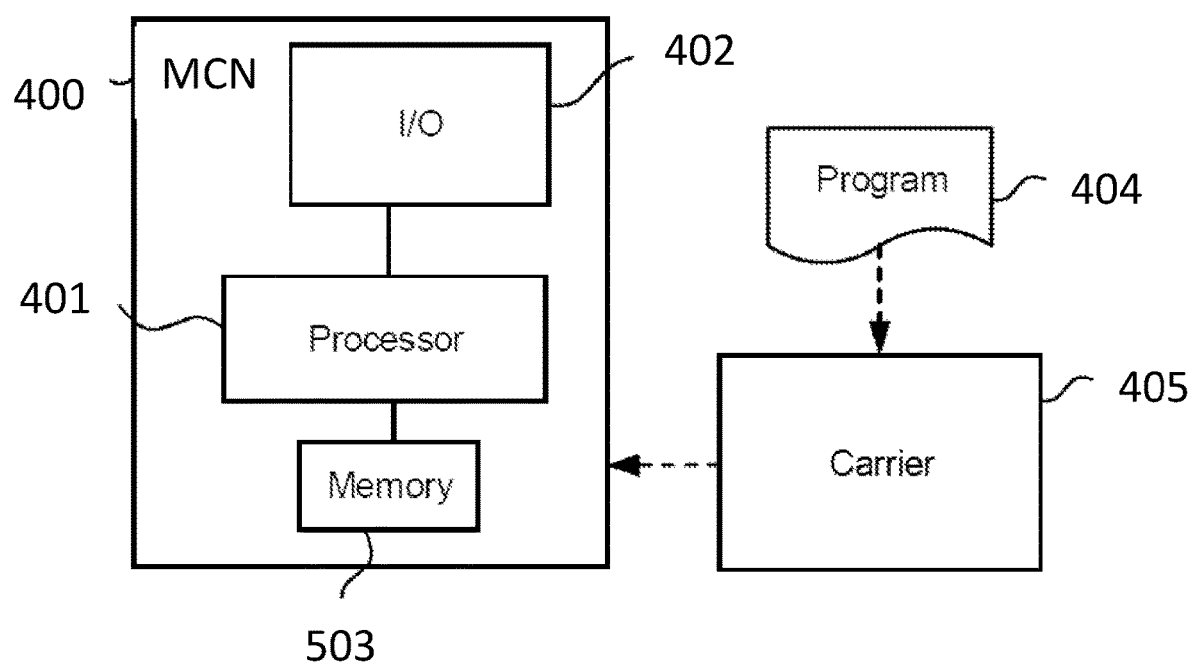
FIG. 4 is a schematically illustration of an exemplary sender device of the present invention.

Turning now to FIG. 4, a schematically illustrated multipoint conferencing node (MCN) 400. The MCN 400 comprises an input/output circuitry 402, at least one processor 401 and a memory 403. The memory 403 contains instructions executable by the processor 401, cause the MCN 400 to:

transmitting a first transmission bitrate of media packets in the media stream;

transmitting a second transmission bitrate of recovery packets into the media stream, each recovery packet adapted to replace a missing media packet in the media stream;

mapping for each packet in the media stream a packet identifier, a transmission timestamp and a packet size;

receiving, for each packet received at the receiving device a feedback message, the feedback message comprising the packet identifier and an arrival timestamp;

determining a real transmission rate for each sliding window of N transmitted packets by dividing a packet size sum of the N transmitted packets with a time difference between a transmission time stamp of the last of the N transmitted packets and a transmission time stamp of the first of the N transmitted packets;

determining a real received rate for each sliding window of the N transmitted packets by dividing the packet size sum of the N transmitted packets with a time difference between the arrival time stamp of the last of the N transmitted packets and the arrival time stamp of the first of the N transmitted packets;

determining a delta rate by dividing the difference between the real transmission rate and the real received rate with the real transmission rate;

mapping for each recovery packet in the media stream the packet identifier of the recovery packet and the packet identifier of the packet the recovery packet is adapted to replace;

determining a packet as missing when none of the feedback messages comprises the packet identifier of the packet;

determining a packet as recovered when a feedback message comprises the packet identifier of a recovery packet corresponding to the missing packet; and determining a packet recovery success rate by dividing a total number of packets determined as recovered within a second sliding window with a total number of packets determined as missing within the second sliding window; and the MCN is further adapted to:

if the sum of the first transmission bitrate and the second transmission bitrate is below the maximum bitrate, and the delta rate is below a first upspeeding threshold, then transmitting a third transmission bitrate of recovery packets in the media stream in addition to the second transmission bitrate of recovery;

if the delta rate exceeds the first upspeeding threshold and the packet recovery success rate is below a second upspeeding threshold, then stopping transmitting the third transmission bitrate of recovery packets, or if the delta rate is below the first upspeeding threshold and the packet recovery success rate is above the second upspeeding threshold, then increasing the first transmission bitrate of media packets in the media stream with the third transmission bitrate, stopping transmitting the third transmission rate of recovery packets.

The instructions that are executable by the processor 401 may be software in the form of a computer program 404. The computer program 404 may be contained in or by a carrier 405, which may provide the computer program 501 to the memory 403 and processor 401. The carrier 405 may be in any suitable form including an electronic signal, an optical signal, a radio signal or a computer readable storage medium.

As used herein, the term "computer readable medium" may be a universal serial bus (USB) memory, a digital versatile disc (DVD), a Blu-ray disc, a software module that is received as a stream of data, a Flash memory, a hard drive, a memory card, such as a MemoryStick, a multimedia card (MMC), secure digital (SD) card, etc. One or more of the aforementioned examples of computer readable medium may be provided as one or more computer program products.

In the preceding description, various aspects of the method and imaging processing device according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the method and image processing device, which are apparent to persons skilled in the art to which the disclosed subject matter pertains, are deemed to lie within the scope of the present claims.

What is claimed is:

1. A method of upspeeding a media stream transmitted over a communication link from a sender device to a receiving device, the communication link configured with a maximum bitrate, the method comprising the steps of:
    transmitting a first transmission bitrate of media packets in the media stream;
    transmitting a second transmission bitrate of recovery packets into the media stream, each recovery packet adapted to replace a missing media packet in the media stream;
    mapping for each packet in the media stream a packet identifier, a transmission timestamp and a packet size;
    transmitting for each packet received at the receiving device a feedback message to the sender device, the feedback message comprising the packet identifier and an arrival timestamp;
    determining a real transmission rate for each sliding window of N transmitted packets by dividing a packet size sum of the N transmitted packets with a time difference between a transmission time stamp of the last of the N transmitted packets and a transmission time stamp of the first of the N transmitted packets;
    determining a real received rate for each sliding window of the N transmitted packets by dividing the packet size sum of the N transmitted packets with a time difference between the arrival time stamp of the last of the N transmitted packets and the arrival time stamp of the first of the N transmitted packets;
    determining a delta rate by dividing the difference between the real transmission rate and the real received rate with the real transmission rate;
    mapping for each recovery packet in the media stream the packet identifier of the recovery packet and the packet identifier of the packet the recovery packet is adapted to replace;
    determining a packet as missing when none of the feedback messages comprises the packet identifier of the packet;
    determining a packet as recovered when a feedback message comprises the packet identifier of a recovery packet corresponding to the missing packet; and
    determining a packet recovery success rate by dividing a total number of packets determined as recovered within a second sliding window with a total number of packets determined as missing within the second sliding window; wherein the step of upspeeding the media stream comprises the steps of:
    if the sum of the first transmission bitrate and the second transmission bitrate is below the maximum bitrate, and the delta rate is below a first upspeeding threshold, then transmitting a third transmission bitrate of recovery packets in the media stream in addition to the second transmission bitrate of recovery packets;
    if the delta rate exceeds the first upspeeding threshold and the packet recovery success rate is below a second upspeeding threshold, then stopping transmitting the third transmission bitrate of recovery packets; and
    if the delta rate is below the first upspeeding threshold and the packet recovery success rate is above the second upspeeding threshold, then increasing the first transmission bitrate of media packets in the media stream with the third transmission bitrate, stopping transmitting the third transmission rate of recovery packets, and returning to the first step of upspeeding the media stream.

2. The method of claim 1, wherein if the first transmission rate of media packets has increased with the third transmission bitrate at least one time, then the step of transmitting a third bitrate of recovery packets in the media stream further comprising multiplying the third bitrate with a multiplication factor.

3. The method of claim 2, wherein if the first transmission rate of media packets has increased with the third transmission bitrate at least one time, then the method further comprising increasing the multiplication factor each time the first transmission rate of media packets has increased with the third transmission bitrate.

4. The method of claim 1, wherein the first upspeeding threshold is 0.1.

5. The method of claim 1, wherein the second upspeeding threshold is in the range 0.6-1.0, preferably 0.8.

6. The method of claim 1, wherein the step of transmitting the third transmission bitrate of recovery packets in the media stream further comprises setting the third transmission bitrate such that the sum of the first transmission bitrate, the second transmission bitrate and the third transmission bitrate is below the maximum bitrate.

7. The method of claim 1, wherein the step of transmitting the third transmission bitrate of recovery packets in the media stream further comprises setting the third transmission bitrate by rounding the third transmission bitrate down to nearest 64 kbps.

8. The method of claim 1, wherein the step of increasing the first transmission bitrate of media packets in the media stream with the third transmission bitrate comprises instructing an encoder to encode media packet at the increased first transmission bitrate of media packets.

9. The method of claim 1, wherein the step of increasing the first transmission bitrate of media packets in the media stream with the third transmission bitrate comprises selecting a closest matching media stream from an encoder providing a plurality of media streams at different transmission rates.

10. A computer program product comprising a non-transitory storage medium storing instructions that when executed on a processor performs the method of claim 1.

11. A system for upspeeding of a media stream transmitted over a communication link from a sender device to a receiving device, the communication link configured with a maximum bitrate, the system comprising:
    input/output circuitry configured to:
        transmit a first transmission bitrate of media packets in the media stream;
        transmit a second transmission bitrate of recovery packets into the media stream, each recovery packet adapted to replace a missing media packet in the media stream;

a processor in communication with the input/output circuitry and configured to:
  map for each packet in the media stream a packet identifier, a transmission timestamp and a packet size;
  receive for each packet received at the receiving device a feedback message, the feedback message comprising the packet identifier and an arrival timestamp;
  determine a real transmission rate for each sliding window of N transmitted packets by dividing a packet size sum of the N transmitted packets with a time difference between a transmission time stamp of the last of the N transmitted packets and a transmission time stamp of the first of the N transmitted packets;
  determine a real received rate for each sliding window of the N transmitted packets by dividing the packet size sum of the N transmitted packets with a time difference between the arrival time stamp of the last of the N transmitted packets and the arrival time stamp of the first of the N transmitted packets;
  determine a delta rate by dividing the difference between the real transmission rate and the real received rate with the real transmission rate;
  map for each recovery packet in the media stream the packet identifier of the recovery packet and the packet identifier of the packet the recovery packet is adapted to replace;
  determine a packet as missing when none of the feedback messages comprises the packet identifier of the packet;
  determine a packet as recovered when a feedback message comprises the packet identifier of a recovery packet corresponding to the missing packet; and
  determine a packet recovery success rate by dividing a total number of packets determined as recovered within a second sliding window with a total number of packets determined as missing within the second sliding window;
wherein the sender device is further adapted to:
  if the sum of the first transmission bitrate and the second transmission bitrate is below the maximum bitrate, and the delta rate is below a first upspeeding threshold, then transmit a third transmission bitrate of recovery packets in the media stream in addition to the second transmission bitrate of recovery packets;
  if the delta rate exceeds the first upspeeding threshold and the packet recovery success rate is below a second upspeeding threshold, then stop transmitting the third transmission bitrate of recovery packets; and
  if the delta rate is below the first upspeeding threshold and the packet recovery success rate is above the second upspeeding threshold, then increase the first transmission bitrate of media packets in the media stream with the third transmission bitrate, stopping transmitting the third transmission rate of recovery packets.

12. The system of claim 11, wherein sender device if the first transmission rate of media packets has increased with the third transmission is further adapted to multiplying the third bitrate with a multiplication factor.

13. The system of claim 12, wherein the sender device is further adapted to increasing the multiplication factor each time the first transmission rate of media packets has increased with the third transmission bitrate.

14. The system of claim 11 wherein the first upspeeding threshold is 0.1.

15. The system of claim 11, wherein the second upspeeding threshold is in the range 0.6-1.0, preferably 0.8.

16. The system of claim 11, wherein the sender device is further adapted to setting the third transmission bitrate such that the sum of the first transmission bitrate, the second transmission bitrate and the third transmission bitrate is below the maximum bitrate.

17. The system of claim 11, wherein the sender device is further adapted to setting the third transmission bitrate by rounding the third transmission bitrate down to nearest 64 kbps.

18. The system of claim 11, wherein the sender device is further adapted to instructing an encoder to encode media packet at the increased first transmission bitrate of media packets.

19. The system of claim 11 wherein the sender device is further adapted to selecting a closest matching media stream from an encoder providing a plurality of media streams at different transmission rates.

* * * * *